Patented Nov. 4, 1952

2,616,841

UNITED STATES PATENT OFFICE 2,616,841

PROCESS OF REDUCING CUPROUS OXIDE COATINGS TO PRODUCE PATTERNS OR DESIGNS, AND BATHS FOR USE IN THE PROCESS

Jesse Edwin Stareck, Birmingham, Mich., assignor to Kansas City Testing Laboratory, Kansas City, Mo., a corporation of Missouri No Drawing. Application August 24, 1946, Serial No. 692,917

10 Claims. (Cl. 204—52)

This invention relates to processes for reducing cuprous oxide coatings to produce patterns or designs, and to baths for use in the process.

The present invention provides an improved process and baths for the purpose stated above, and is an improvement on the process and bath disclosed in Patent No. 2,313,456 granted to me March 9, 1943.

By the present improvements the following advantages are obtained:

(1) A wider range is obtained for the voltages in the range ("sub-medium") in which the sparkling crystal type of pattern is produced, and also in the range ("low") in which the stippled or etched type of pattern is produced.

(2) The patterns produced are more iridescent than the iridescent patterns heretofore produced;

(3) Greater uniformity of pattern size is produced.

According to the present invention, the baths (aqueous) in which the electrolytic reduction is carried out contain sodium hydroxide, or sodium hydroxide and sodium carbonate, and ammonia. The baths may also contain nitrate ($NO_3$). The alkali-metal equivalents of the sodium hydroxide and the sodium carbonate may be used.

The function of the sodium hydroxide is to increase the pH of the solution and to increase the iridescence of the reduced cuprous oxide coating.

The function of the $NH_3$ is also to increase iridescence, to widen the low and sub-medium voltage ranges, particularly at the lower end, to produce greater uniformity of the pattern produced by the electrolytic reduction, and to act as a carrier of hydrogen ions ($H^+$) to the cuprous oxide coating. The ammonia appears to adsorb hydrogen ion and carry it with it to the surface of the cuprous oxide coating, at the cathode pole under the action of the electric current. The adsorbed hydrogen ion is detached at the surface of the cuprous oxide coating, and having small size or mass readily passes through the cuprous oxide coating to the underlying metal, combining with the oxygen left from the electrolytically reduced cuprous oxide, starting at the underside of the cuprous oxide coating, i. e. at the part of the cuprous oxide coating lying next to the metal underlying it.

The function of the nitrate ($NO_3$) is to widen the low and sub-medium voltage ranges at the high end. The ammonia and the nitrate have a cumulative effect in widening the voltage ranges, the ammonia having its main effect at the low end and the nitrate at the high end.

The sodium carbonate acts as a conducting salt and improves current distribution.

The constituents may be present in variable amounts as follows:

| | | |
|---|---|---|
| NaOH | g./l | 7.5 to 60 |
| $Na_2CO_3$ | do | 0 to 120 |
| $NH_3$ | do | 0.2 to 5 |
| $NaNO_3$ | do | 0 to 10 |

The following baths are given by way of example:

Example I

| | | |
|---|---|---|
| NaOH | g./l | 30 |
| $NH_3$ (8.0 cc./1/29% soln.) | do | 2 |

Example II

| | | |
|---|---|---|
| NaOH | g./l | 15 |
| $Na_2CO_3$ | do | 15 |
| $NH_3$ | do | 2 |

Example III

| | | |
|---|---|---|
| NaOH | g./l | 20 |
| $Na_2CO_3$ | do | 100 |
| $NH_3$ | do | 1 |

Example IV

| | | |
|---|---|---|
| NaOH | g./l | 30 |
| $Na_2CO_3$ | do | 100 |
| $NH_3$ | do | 1 |
| $NaNO_3$ | do | 1 |

Example V

| | | |
|---|---|---|
| NaOH | g./l | 15 |
| $NH_3$ | do | 2 |
| $NaNO_3$ | do | 0.5 |

Cuprous oxide is sensitive to light. Light falling on an object suspended in the electrolytic solution under ordinary conditions, will cause a difference of electrical conductance of the cuprous oxide at certain areas over its conductance at other areas, and this in turn will affect the uniformity of the pattern which is produced by the electrolytic reducing action which is effected in the solution. With a view to counteracting the disturbing effect of light on the electrolytic reduction of the cuprous oxide, the solution in which the electrolytic reduction is carried out is dyed. This is readily done by adding a dyestuff to the solution which is soluble in an alkaline solution. It has been found that the wavelengths in the spectrum having the most activating effect are absorbed, or cut off from the cuprous oxide, when the bath solution is dyed a red or purplish red. The dyestuff used in practice is phenosaffranine. Quite small amounts have a beneficial effect. In practice 25 thousandths gram per liter (0.025 g./l.) are used. Obviously more can be used if desired.

The cuprous oxide coating which is reduced according to the present invention to form a pattern or design, is produced in any known way. An advantageous method of producing the cuprous oxide coating is to electrodeposit it according to the method disclosed in U. S. Patent 2,081,121, May 18, 1937.

The cuprous oxide coating should be of sufficient thickness so that after it is subjected to electrolytic reduction the pattern or design which is formed is clearly revealed. A sufficient thickness has been found to be about three one hundred thousandths of an inch, and for producing the crystal type pattern and the stippled type pattern, it is well not to exceed a thickness of about ten one hundred thousandths of an inch.

The size of the individual patterns is primarily a function of the thickness of the cuprous oxide coating (within the approximate limits set out above) which undergoes reduction. The thicker the cuprous oxide coating the larger the size of the individual patterns resulting from the reduction.

The voltage ranges for producing crystal type patterns (with iridescence) and stippled type patterns, by electrolytic reduction in baths according to the present invention, are Sparkling crystal type, 2 to 12 volts ("submedium" range)
Stippled type, 1.6 to 6 volts ("low" range)

These voltages are given with reference to normal conditions, i. e. anode to cathode ratio of 1:1; bath temperature 70° F. (21.1° C.) for crystal type patterns and 100° F. (37.8° C.) for stippled type patterns; anode to cathode spacing of 12 inches; and bath having the composition of Example I above.

When patterns of smaller individual size are being produced, it is preferable to start with higher voltages within the ranges given above than when larger individual patterns are being produced. Also, the preferred procedure is to start reduction with the voltage in the low part of the respective voltage range, and, after a minute or two, gradually increase the voltage. Representative voltages for producing the crystal type pattern are given in the following table:

| Voltage | | Pattern Size | Cu₂O Thickness (mils) |
| --- | --- | --- | --- |
| Starting | Final | | |
| 3.0 | 6.0 | Small | 0.030 |
| 2.5 | 4.5 | Medium | 0.045 |
| 2.0 | 3.0 | Large | 0.060 |

*Temperature*

For producing the iridescent crystal type pattern, the bath is used at room temperature, i. e. 50° to 80° F. (10° C. to 26.7° C.), the lower the temperature, the greater the iridescence and the uniformity of the pattern which is produced by the electrolytic reduction.

For producing the stippled type of pattern, temperatures of 80° F. to 150° F. (26.7° C. to 65.6° C.) are most favorable.

According to the present process, a metal article having a cuprous oxide coating thereon of suitable thickness (approximately three one-hundred thousandths of an inch and more, 3 to 10 one-hundred thousandths ordinarily being used) is immersed in a bath having the novel composition herein disclosed, and advantageously dyed also as herein disclosed, and current passed, at voltages and temperatures within the ranges appropriate for producing the type of pattern or design desired, through the bath to the article having the cuprous oxide coating thereon, as a cathode, the current being continued until part or all of the cuprous oxide is reduced to metallic copper as desired, and, as may be determined by visual inspection, and, in general, within 2 to 10 minutes. The appropriate voltage ranges for producing particular types of patterns is given in a foregoing part of this specification.

A specific mode of procedure for practicing the process is as follows:

Bath:
NaOH, 15 g./l.
Na₂CO₃, 15 g./l.
NH₃, 2 g./l.
Phenosaffranine, 0.1 g./l.
Temperature, 60°–70° F. (15.6° C. to 21.1° C.)

An article having a medium size crystal type of pattern is desired. A voltage in the "submedium" range being appropriate for this type of pattern, a voltage within this range of 2 to 12 volts is selected, the voltage being initially adjusted to a voltmeter reading of 2.5 volts, and gradually raised to 5 volts.

A metal article having a cuprous oxide coating of proper thickness, for instance four one hundred thousandths of an inch, is immersed in the bath at room temperature and connected in the circuit as a cathode. Current is then passed for about five minutes, the cuprous oxide being electrolytically reduced to metallic copper, a crystal type design or pattern being formed in the course of the electrolytic reduction. The article is then removed from the bath and rinsed. The pattern has a high degree of uniformity and the article exhibits good iridescence.

An article having a stippled type of pattern is desired. A voltage in the "low" range being appropriate to this type of pattern, a voltage within this range of 1.6 to 6 volts is selected, the voltage being initially adjusted to a voltmeter reading of 1.8 volts and gradually raised to 3 volts.

A metal article having a cuprous oxide coating of proper thickness, for instance five hundred thousandths of an inch, is immersed in the bath at a temperature of 100° F. (37.8° C.) and connected in the circuit as cathode. Current is then passed for about four minutes, the cuprous oxide being electrolytically reduced, a stippled type pattern being produced.

This application is a continuation in part of application Ser. No. 685,784, filed July 23, 1946 (now abandoned).

What is claimed is:

1. An improved bath solution for electrolytically reducing cuprous oxide to produce patterns or designs, consisting essentially of 7.5 g./l. to 60 g./l. sodium hydroxide and 0.2 g./l. to 5 g./l. ammonia in aqueous solution.

2. A bath solution for use in a process for electrolytically reducing cuprous oxide to produce patterns or designs, consisting essentially of 7.5 g./l. to 60 g./l. sodium hydroxide, 0.2 g./l. to 5 g./l. ammonia, and sodium nitrate, said sodium nitrate being present in an amount ranging from less than 10 g./l. to 10 g./l., said three preceding compounds being present in aqueous solution.

3. A bath according to claim 1 having an alkali-soluble dyestuff dissolved in the bath solution imparting a coloration thereto and acting to prevent the conductivity of cuprous oxide immersed in the bath from being varied during passage of electric current by light falling on the bath.

4. A bath solution for use in a process for electrolytically reducing cuprous oxide to produce patterns or designs, consisting essentially of 7.5 to 60 g./l. sodium hydroxide, 0.2 to 5 g./l. ammonia, from less than 120 to 120 g./l. sodium carbonate, and from less than 10 to 10 g./l. sodium nitrate, both said sodium carbonate and sodium nitrate being present in the bath, said four preceding compounds being present in aqueous solution, and an alkali-soluble dyestuff dissolved in the bath solution imparting a coloration thereto and acting to prevent the conductivity of cuprous oxide immersed in the bath from being varied during passage of electric current by light falling on the bath.

5. In a process for electrolytically reducing cuprous oxide coatings to produce patterns or designs wherein an anode and the cuprous oxide coating as a cathode are immersed in a bath solution and an electric current is passed from the anode to the cathode, the improvement consisting in widening the voltage range for the current and coincidently producing more iridescent patterns of more uniform size than would otherwise be possible, said improvement being accomplished by employing as the bath solution an aqueous solution consisting essentially of 7.5–60 gms./l. sodium hydroxide and 0.2–5 gms./l. ammonia, and passing current from the anode to the cuprous oxide coating as cathode at a voltage in a widened voltage range of 1.6–12 volts and at a temperature between 50 and 150° F. to reduce the cuprous oxide to metallic copper.

6. In a process for electrolytically reducing cuprous oxide coatings to produce patterns or designs, comprising immersing an anode and the cuprous oxide coating, as a cathode, in a bath solution, the improvement comprising employing as said bath solution an aqueous solution consisting essentially of 7.5 g./l. to 60 g./l. sodium hydroxide, 0.2 g./l. to 5 g./l. ammonia, and sodium nitrate, said sodium nitrate being present and in an amount ranging from less than 10 g./l. to 10 g./l., and passing an electric current from the anode to the cuprous oxide coating (cathode) at a voltage between 1.6 and 12 volts and at a temperature between 50° and 150° F. to reduce the cuprous oxide to metallic copper.

7. In a process for electrolytically reducing cuprous oxide coatings to produce patterns or designs, comprising immersing an anode and the cuprous oxide coating, as a cathode, in a bath solution, the improvement comprising employing as said bath solution an aqueous solution consisting essentially of 7.5 g./l. to 60 g./l. sodium hydroxide, 0.2 g./l. to 5 g./l. ammonia, from less than 120 g./l. to 120 g./l. sodium carbonate, and from less than 10 g./l. to 10 g./l. sodium nitrate, both said sodium carbonate and sodium nitrate being present in the solution, and passing an electric current from the anode to the cuprous oxide coating (cathode) at a voltage between 1.6 and 12 volts and at a temperature between 50° and 150° F. to reduce the cuprous oxide to metallic copper.

8. In a process for electrolytically reducing cuprous oxide coatings to produce patterns or designs, comprising immersing an anode and the cuprous oxide coating, as a cathode, in a bath solution, the improvement comprising employing as said bath solution an aqueous solution consisting essentially of 7.5 to 60 g./l. sodium hydroxide, 0.2 g./l. to 5 g./l. ammonia, and from less than 120 g./l. to 120 g./l. sodium carbonate, said sodium carbonate being present in the solution, and passing an electric current from the anode to the cuprous oxide coating (cathode) at a voltage between 1.6 and 12 volts and at a temperature of 50° to 150° F. to reduce the cuprous oxide to metallic copper.

9. A process according to claim 5 wherein said solution further contains a dissolved alkali-soluble dyestuff imparting a coloration thereto and acting to prevent the conductivity of cuprous oxide immersed in the bath from being varied during passage of electric current by light falling on the bath.

10. A process of electrolytically reducing cuprous oxide coatings to produce patterns or designs, comprising dissolving an alkali-soluble dyestuff in an alkaline bath solution to impart a coloration to the bath, and reducing electrolytic cuprous oxide suspended in the bath solution as a cathode, the dissolved dyestuff in the bath acting to prevent the conductivity of cuprous oxide immersed in the bath from being varied during passage of the electric current by light falling on the bath.

JESSE EDWIN STARECK.

REFERENCES CITED

The following references are of record in the file of this patent:

UNITED STATES PATENTS

| Number | Name | Date |
| --- | --- | --- |
| 271,901 | Munder | Feb. 6, 1883 |
| 409,618 | Spiro | Aug. 20, 1889 |
| 768,818 | Nelson | Aug. 30, 1904 |
| 1,009,981 | Lesser | Nov. 28, 1911 |
| 1,526,127 | Flick | Feb. 10, 1925 |
| 1,584,022 | Englund | May 11, 1926 |
| 1,807,326 | Ruben | May 26, 1931 |
| 2,313,456 | Stareck | Mar. 9, 1943 |

FOREIGN PATENTS

| Number | Country | Date |
| --- | --- | --- |
| 258,726 | Great Britain | Sept. 30, 1926 |

OTHER REFERENCES

"Transactions Of The Electrochemical Society," vol. 80 (1941), page 29.